United States Patent [19]

Capps

[11] Patent Number: 5,172,928

[45] Date of Patent: Dec. 22, 1992

[54] BOAT BOW STOP MECHANISM

[76] Inventor: Lloyd O. Capps, Rte. 5, Box 338, Claremore, Okla. 74017

[21] Appl. No.: 697,256

[22] Filed: May 8, 1991

[51] Int. Cl.$^5$ ............................................. B60P 3/10
[52] U.S. Cl. ............................. 280/414.1; 280/164.1; 414/532
[58] Field of Search .................. 280/414.1, 163, 164.1; 414/529, 530, 531, 532, 533, 534, 535, 536, 559

[56] References Cited

U.S. PATENT DOCUMENTS

| | | | |
|---|---|---|---|
| 3,067,892 | 12/1962 | Barrett et al. | 414/532 |
| 3,984,121 | 10/1976 | Dobosi | 280/414.1 |
| 4,094,527 | 6/1978 | Miller | 414/559 |
| 4,468,150 | 8/1984 | Price | 280/414.1 X |
| 4,529,217 | 7/1985 | Wood | 280/414.1 |
| 4,974,865 | 12/1990 | Capps | 280/414.1 |

Primary Examiner—Charles A. Marmor
Assistant Examiner—Jeffrey A. Kuta
Attorney, Agent, or Firm—Head & Johnson

[57] ABSTRACT

An improved boat trailer bow stop assembly which allows the boat operator to use the bow stop bumpers as a point of reference to ease in the loading and unloading of a boat from a trailer frame. The bow stop assembly has steps built into the structural members to allow the passengers to easily board the boat before launching and unboard the board once the boat is brought out of the water. The bow stop is located at an elevated position so that the operator can winch the boat on to the trailer without having to leave the boat. The bow stop assembly can be moved along and secured in the desired spot by U-bolts in order to accommodate a variety of different boats. The bow stop bumper pads are also adjustable to accommodate a variety of different boat types.

10 Claims, 2 Drawing Sheets

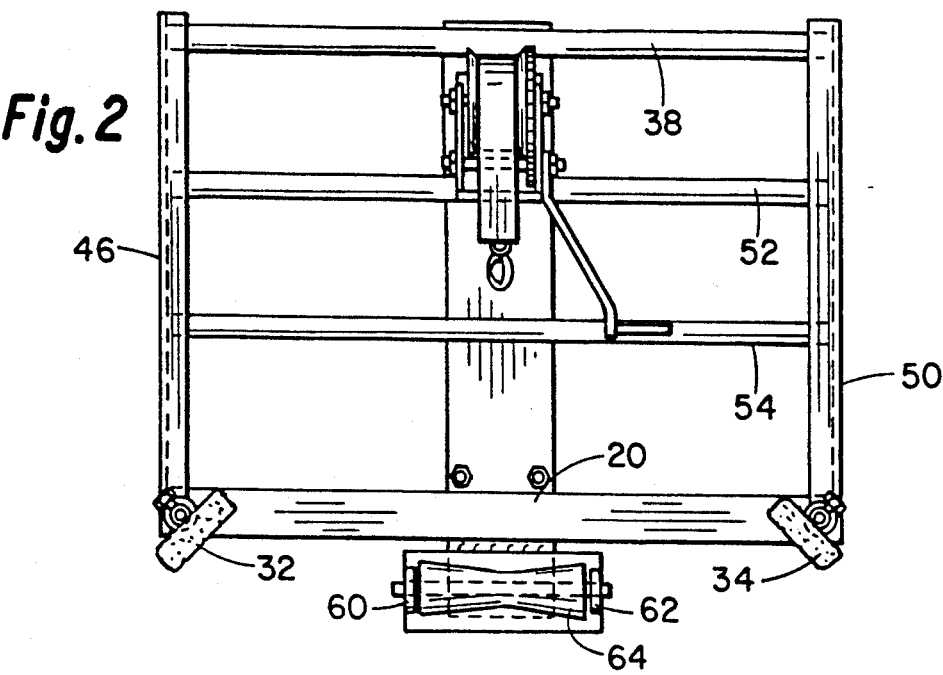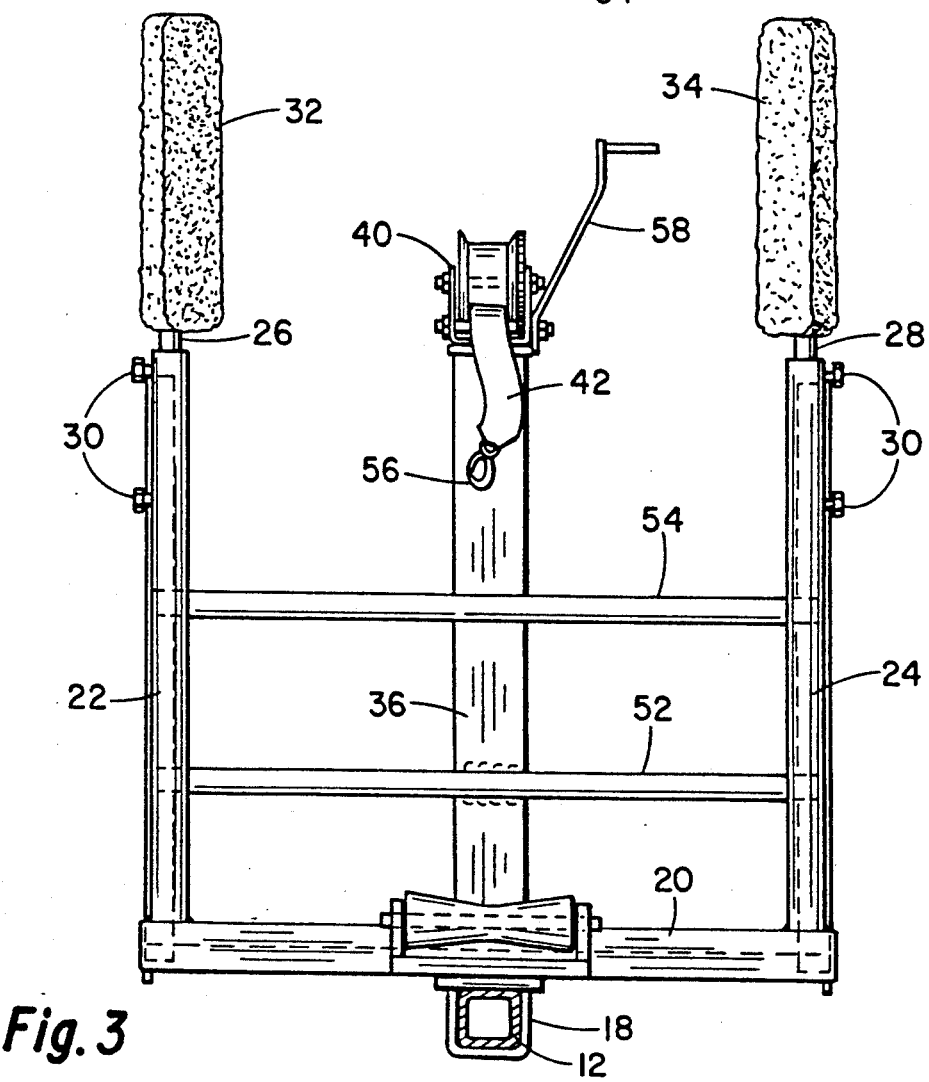

BOAT BOW STOP MECHANISM

BACKGROUND OF THE INVENTION

1. Field of the Invention

This invention relates to an improved boat trailer bow stop mechanism designed to ease in the loading of a pleasure boat onto a trailer.

2. Description of the Related Art

It is generally known it is a common practice among operators of pleasure boats when unloading a boat from a trailer to first back the trailer into the water and disengage the hook connected to an eyelet on the bow of the boat. The boat is then either manually pushed or floated off of the partially submerged trailer. When loading, the boat is positioned over the partially submerged trailer, and the winch hook is connected to the eyelet on the bow of the boat. Next, the boat is winched up onto the trailer until the boat's weight is transferred to the trailer. Invariably, the pleasure boat operator gets his or her feet wet. Most often, this procedure is time consuming and requires considerable physical strength. Often, this procedure is frustrating, especially if a natural current or wind is acting on the boat, thereby disrupting its position over the partially submerged trailer. Many times the loading and unloading procedures cause damage to the hull of the pleasure boat.

SUMMARY OF THE INVENTION

In view of the problems associated with the prior art methods of floating small boats onto trailers, the present invention provides an improved boat trailer bow stop assembly that allows the boat operator to drive the boat onto the trailer, provides visual references to position the boat properly over the partially submerged trailer, and then winch the boat into a secure position on the trailer for transportation without leaving the boat or getting wet. Furthermore, the entire procedure of loading the boat onto the trailer can be quick, thereby reducing the effects of wind and currents on loading or unloading the boat.

Thus, the present invention has structural components of a base plate moveable to the desired position and securable to the trailer tongue. A winch is attached to the upper portion of a vertical winch post located and attached to the top front portion of the base plate. A horizontal support member is secured to the rear portion of the base plate. Pad support members are attached to the opposite ends of the horizontal support member. Located within the pad support members are telescoping, concentrically sleeved pipe members with pads attached to the upper ends.

A step means is located on the winch mechanism to allow entry and exit from the boat when the boat is loaded on the trailer. Left and right side rails extend at a 45 to 60 degree angle with respect to the base plate. The lower ends are attached to the first step and the upper ends are attached to the pad support members. Additional steps are spaced apart along the side rails.

DESCRIPTION OF THE DRAWINGS

FIG. 2 is a top view of a boat trailer bow stop assembly.

FIG. 3 is a rear view of a boat trailer bow stop assembly.

DETAILED DESCRIPTION OF THE PREFERRED EMBODIMENT

Figure 1:
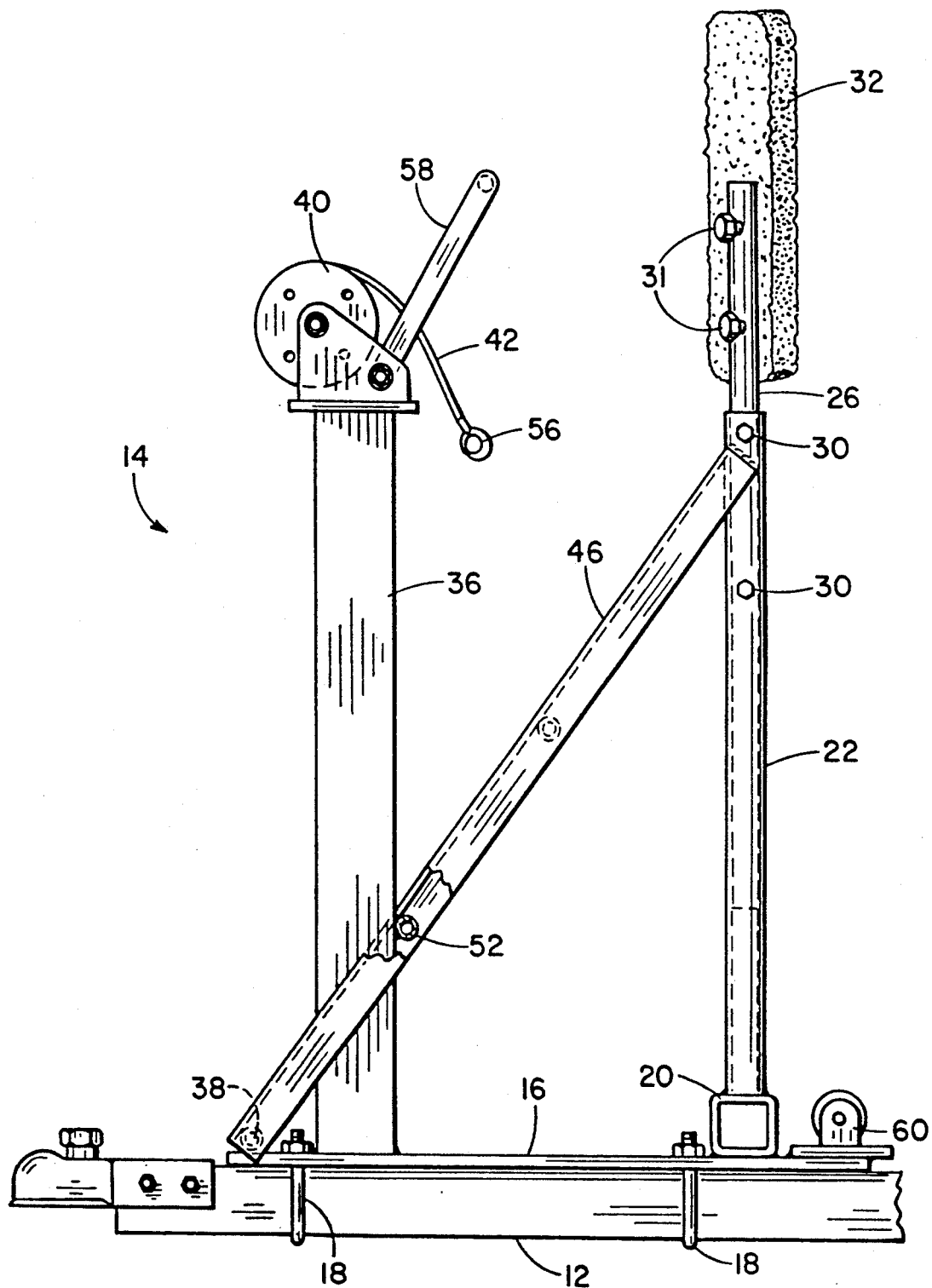
FIG. 1 is a side view of a boat trailer bow stop assembly of this invention.

FIG. 1 illustrates the preferred embodiment of the improved boat trailer bow stop mechanism installed on the trailer tongue 12 of a pleasure boat trailer. As illustrated, the bow stop mechanism's frame 14 is movable along the boat trailer tongue 12 and once in the properly desired position, the base plate 16 of the bow stop mechanism's frame 14 is secured to the boat trailer tongue 12 by U-Bolts 18.

Mounted and fixed to the base plate 16, is horizontal support member 20 which is preferably welded. Horizontal support member 20 is positioned near the rear and along base plate 16. Attached at the opposite ends of the horizontal support member 20 are left and right pad support members 22 and 24. Contained within left and right pad support members 22 and 24 are concentrically sleeved pipe members 26 and 28 which are telescoped therein. The pipe members 26 and 28 can be elevated and adjusted to the desired position and then secured into place by tightening set screws 30 which are supported by pad support members 22 and 24. Attached to the upper ends of pipe members 26 and 28 are pads 32 and 34 which preferably are flat, cushioned members which contact the hull of the boat near the bow thereby providing support, and the pads extend sufficiently high to help properly align the boat on the trailer frame 12. Pads 32 and 34 are secured to pipe members 26 and 28 by bolts 31. The pads 32 and 34 can be positioned sufficiently high provide a visual reference for the boat operator so that the boat can be properly positioned on trailer tongue 12. By providing a visual reference the possibility of improperly aligning the boat on trailer tongue 12 is reduced, thereby reducing the possibility of damaging the boat hull. The pads 32 and 34 are adjustable allowing them to strike the boat hull at the bumper strip thereby helping to eliminate scratches and nicks on the hull. The pads 32 and 34 also rotate 360 degrees so that they can be positioned in the desired point depending upon the type of boat.

Positioned perpendicular to the flat plane of base plate 16 and on the forward part of base plate 16 is winch support post 36. Mounted on the upper end of winch support post 36 is a winch 40 which pulls the boat onto its final resting position on trailer tongue 12 by way of a strap or cable 42. The winch 40 is mounted to be operated from the boat. This allows the boat operator to load and unload without having to jump from the boat to trailer tongue 12. This ensures that the boat operator stays dry and decreases their risk of injury when jumping from a boat onto the wet surfaces of the trailer frame 12.

There are step means provided on the bow stop mechanism to permit entry and exit from a boat loaded on the trailer. A first side rail 46 and a second side rail 50 extends respectively from pad support members 22 and 24 to base plate 16 forward of winch support post 36. These side rails 46 and 50 preferably extend at about 45 to 60 degree angles with the base plate 16. Horizontal rod members 38, 52 and 54 extend between side rails 46 and 50 and are secured thereto. The first rod member 38, second rod member 52, and third rod member 54 are positioned to form steps, allowing individuals to climb up the bow stop mechanism frame 14 and enter or leave the boat.

To use the improved boat trailer bow stop when unloading the boat from the trailer, the boat operator, as well as any passengers, can easily board the boat while in the parking lot while the boat is waiting to be launched. Entry into the boat is accomplished via the steps provided for by the first, second and third rod members 38, 52 and 54. Once the boat is loaded with its passengers, the towing vehicle backs the boat down the launching ramp until the boat starts to float. Hook 56, attached to the end of the strap or cable 42 is released from the eyelet on the boat. Once the boat engine is started, and the propeller placed into reverse, the boat can back off and away from the trailer.

To load the boat, the trailer is backed down a ramp and the boat operator positions the boat over the partially submerged trailer by using pads 32 and 34 as reference points. The operator can then go to the bow of the boat and attach hook 56 to the eyelet on the boat's hull. The operator then cranks the winch handle 58 until the boat is held firmly on trailer tongue 12. The tow vehicle then pulls the boat trailer with the boat and its passengers into the parking lot for unloading. The passengers can leave the boat via steps 38, 52 and 54. This procedure is safer and there is less likelihood of losing valuable equipment when loading and unloading is accomplished while the boat is in the water at the dock.

On the rearward end of base plate 16, flanges 60 and 62 can be attached to support roller 64. Roller 64 is for added support of the boat hull bow.

The actual construction of the improved boat trailer bow stop can be made from a variety of materials well known in the art. Illustrative, but not limited to is construction of the structural members from steel or fiber reinforced plastics.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A boat trailer bow stop assembly comprising:
a base plate movably attached to a trailer tongue;
a horizontal support member attached to said plate;
a first vertical winch support post secured to said base plate;
a first step means having first ends and second ends;
a left side rail attached to said first ends of said step means;
a right side rail attached to said second ends of said step means;
a left vertical pad support means attached at its lower end to said horizontal support member and attached near its upper end to said left side rail;
a right vertical pad support means attached at its lower end to said horizontal support member and attached near its upper end to said right side rail;
a winching means attached to the top portion of said winch support post; and
left and right pad members attached to the upper ends of said pad support members.

2. A boat trailer bow stop assembly, as described in claim 1, including telescoping concentrically sleeved pipe segments having a plurality of set screws for holding the pipe segments in a final desired position, said pad members attached to said pipe segments.

3. A boat trailer bow stop assembly, as described in claim 1, wherein said pad members are rotatable 360 degrees.

4. A boat trailer bow stop assembly, as described in claim 1, including a roller positioned aft of said base plate.

5. A boat trailer bow stop assembly comprising: a trailer frame;
a base plate movably attached to said trailer frame;
a horizontal support member having a first and second end portion,
a first vertical winch support post attached to said base plate;
a first and second angled support member supported from said base plate;
a second vertical support member attached at its bottom end to said first end of said horizontal support member and near its upper end to said first angled support member;
a third vertical support member attached at its bottom end to said second end of said horizontal support member and near its upper end to said second angled support member;
a pad attached to the upper end of each said second and third vertical support members; and
a winching means attached to the top portion of said first vertical support post.

6. A boat trailer bow stop assembly, as described in claim 5, including a plurality of steps attached to said first and second angled support members.

7. A boat trailer bow stop assembly, as described in claim 5, wherein said pads are adjustable vertically such as to position said pads with respect to the boat so that the boat operator can see the upper portion of the pads during loading operations.

8. A boat trailer bow stop assembly, as described in claim 5, wherein said pads are attached to concentrically telescoping sleeved pipe segment each having a plurality of set screws for holding each pipe segments in a desired position.

9. A boat trailer bow stop assembly, comprising:
a trailer frame;
a base plate movably attached to said trailer frame;
a vertical winch support post secured at its lower end to said base plate;
a first vertical pad support post attached at its lower end to said a horizontal support member;
a second vertical pad support post attached at its lower end to said horizontal support member, the support posts being spaced apart from each other;
a winching means attached to the top of said winch support post and having a retrievable line extending therefrom attachable to the bow of a boat; and
first and second pad members attached to the upper ends of said first and second pad support members, the pad members being adaptable to engage the bow of a boat positioned on a trailer tongue, said winch serving as means to secure the bow of a boat into contact with said pad members.

10. A boat trailer bow stop assembly, as described in claim 5, wherein said first and second angled support members extend forward of said first and second pad support members, supporting said pad support members to said base plate.

* * * * *